United States Patent [19]

Maekawa

[11] Patent Number: 4,727,468

[45] Date of Patent: Feb. 23, 1988

[54] DIGITAL PWM CONTROL CIRCUIT

[75] Inventor: Katsumi Maekawa, Tokorozawa, Japan

[73] Assignee: Kabushiki Kaisha Toshiba, Kawasaki, Japan

[21] Appl. No.: 22,955

[22] Filed: Mar. 6, 1987

[30] Foreign Application Priority Data

Aug. 22, 1984 [JP] Japan ............... 59-173357

[51] Int. Cl.$^4$ ............................................. H02M 1/12
[52] U.S. Cl. ......................................... 363/41; 318/811;
363/131; 363/135
[58] Field of Search .................... 363/40, 41, 42, 98,
363/97, 96, 131–139; 318/801, 802, 810, 811;
364/718, 721

[56] References Cited

U.S. PATENT DOCUMENTS

| 4,099,109 | 7/1978 | Abbondanti | 318/811 |
| 4,166,247 | 8/1979 | Miyazawa | 363/41 X |
| 4,337,429 | 6/1982 | Stuart | 363/41 X |
| 4,348,734 | 9/1982 | Dougherty | 363/41 X |
| 4,613,933 | 9/1986 | Shaw | 363/41 X |
| 4,636,928 | 1/1987 | Deguchi et al. | 363/41 |

FOREIGN PATENT DOCUMENTS 60-134774 7/1985 Japan .
60-156273 8/1985 Japan .

Primary Examiner—Peter S. Wong
Attorney, Agent, or Firm—Oblon, Fisher, Spivak, McClelland & Maier

[57] ABSTRACT

The PWM-controlled circuit includes an up/down counter and utilizes the fact that, when a numerical value is a complementary binary value, the sign is indicated by its most significant bit (sign bit). In the PWM control circuit, the up/down counter is controlled so that when its preset input receives a reference signal, a PWM signal of a duty factor proportional to the reference signal is directly obtained from the most significant bit of the output count.

10 Claims, 9 Drawing Figures $\theta = 0° \sim 60°$

DIGITAL PWM CONTROL CIRCUIT

BACKGROUND OF THE INVENTION

The present invention relates to a controller of a PWM inverter, and more particularly to a digital PWM control circuit for converting a reference signal to a PWM signal having a pulse width corresponding to an output voltage of an inverter, thereby controlling the output voltage of the inverter.

Bipolar transistor inverters performing PWM-control have been widely used as economical variable-speed controllers for AC motors. However, according to its operation principle, a PWM inverter inevitably generates noise of the modulation frequency. Since a conventional high-power transistor inverter can perform pulse width modulation (PWM) at a modulation frequency of several kilohertz at most, it generates considerable audible noise, and its general application is thus limited. Therefore, a low-operation-noise PWM inverter has been demanded.

If a power FET (Field-Effect Transistor), which can operate at a speed higher than the operation speed of a bipolar transistor, or an IGT (Insulated Gate Transistor) is used for the PWM control, a modulation frequency of several tens kilohertz (non-audible frequency) can be achieved. When such a high-speed switching element is used to constitute an inverter, a high-speed PWM control circuit is required for the inverter.

In a conventional PWM control, a triangular wave carrier is compared with a reference signal wave to provide a PWM signal. However, according to such a conventional PWM control, it is difficult to actually operate with a triangular wave of several tens kilohertz, and its operation speed cannot be made so high. In addition, if the average level of the triangular wave carrier and that of the reference signal wave do not coincide with each other, a DC component is involved in the PWM control output. In this case, when multiphase PWM control is to be performed, unbalances occur among respective phases. For this reason, according to a conventional PWM control, a fine level adjustment is required for each phase of the multiphase PWM control.

SUMMARY OF THE INVENTION

It is accordingly an object of the present invention to provide a digital PWM control circuit which allows high-speed PWM control.

When a numerical value is expressed as a complementary binary value, the sign is indicated by its most significant bit MSB (sign bit). The present invention utilizes this MSB. According to the present invention, an up/-down counter is controlled so that when its preset input receives a reference signal, a PWM signal of a duty factor proportional to the reference signal is directly obtained from the MSB of the output count.

DETAILED DESCRIPTION OF THE PREFERRED EMBODIMENT

Figure 1:
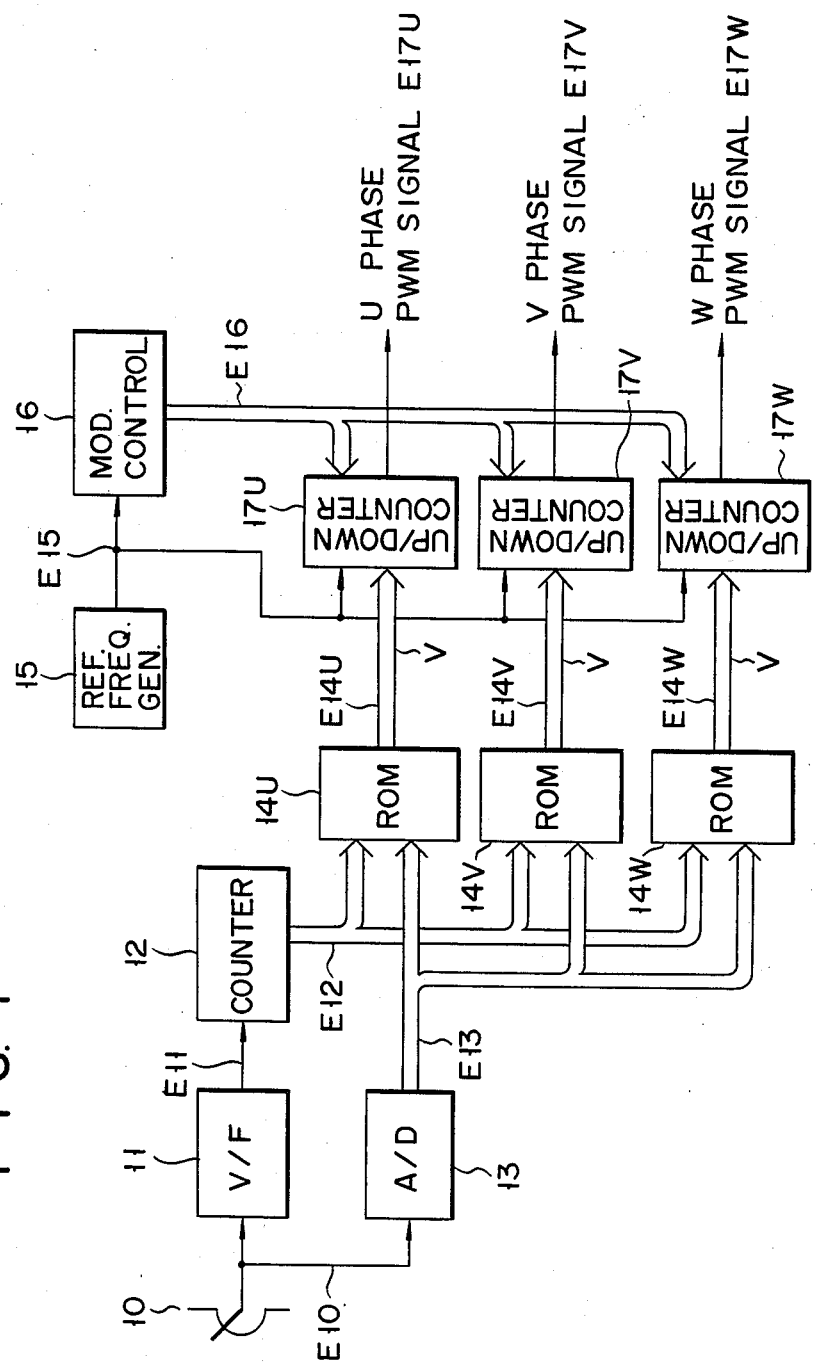
FIG. 1 is a block diagram showing a case wherein a PWM control circuit of the present invention is applied to V/F control of a three-phase induction motor.

FIG. 1 shows a V/F controller of an inverter for driving an induction motor, in which a digital PWM control circuit of the present invention is adapted. Referring to FIG. 1, frequency setter 10 for setting an operation frequency of the inverter, V/F converter 11, counter 12, and A/D converter 13 are provided. ROMs 14U to 14W store predetermined sine wave function data (complementary binary data). The addresses of the sine wave amplitude data in these ROMs 14U to 14W are designated by address signal E13 supplied from A/D converter 13, and the addresses of the sine wave frequency data (phase angle data) are designated by address signal E12 supplied from counter 12. Thus, each of ROMs 14U to 14W operates as a sine wave function generator which is amplitude-controlled by the output from converter 13 and frequency-controlled by an output from counter 12. Note that the functions written in ROMs 14U, 14V, and 14W are phase-shifted from each other 120 degrees so that the outputs from ROMs 14U, 14V, and 14W become three-phase sine waves.

The PWM control circuit of the present invention is formed of reference frequency generator 15, modulation control circuit 16, and up/down counters 17U to 17W. Generator 15 generates clock pulse E15 serving as a reference of the operation speed of the PWM circuit. Control circuit 16 generates signal E16 every time a predetermined number of clock pulses E15 are counted. Counter 17 operates as a PWM signal generator to be based on signal E16. Preset input terminals of counters 17U to 17W receive outputs E14U to E14W from ROMs 14U to 14W, respectively. Each of outputs E14U to E14W serves PWM reference signal V. When counters 17U to 17W count clock pulse E15 under the control of control circuit 16, PWM signals E17U to E17W, corresponding to PWM reference signal V, are obtained from the MSBs of the count output terminals of counters 17U to 17W.

Since the configurations of counters 17U to 17W are the same, only a one-phase (U-phase) of counters 17U to 17W will be described in detail, with reference to FIG. 2.

Figure 2:
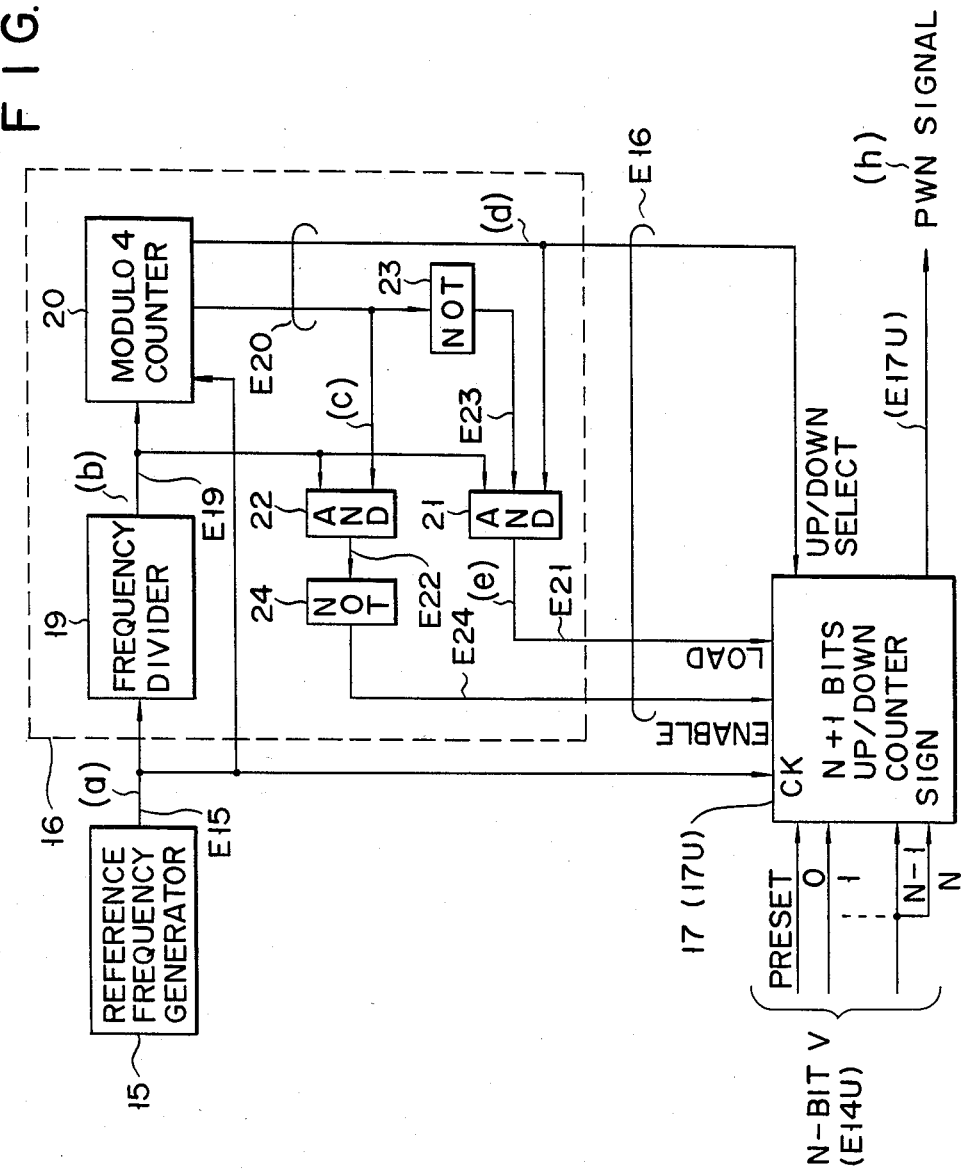
FIG. 2 is a block diagram of an embodiment of the circuit shown in FIG. 1, in which a PWM control circuit for one phase among the three phases of the induction motor is shown.

Referring to FIG. 2, PWM reference signal V (E14U), formed of a plurality of bits, is supplied to the preset input terminals of up/down counter 17. When signal V consists of N bits, counter 17 must have a number of bits larger than N (i.e., N+a bits; a≧1). Assume that counter 17 is a (N+1)-bit counter. In this case, the least significant bit LSB (i.e., 0th bit) to the most significant bit MSB (i.e., (N−1)th bit) of PWM reference signal V are respectively supplied to 0th bit to (N-1)th bit preset input terminals of counter 17. The MSB (Nth bit) of the preset input terminals is connected to the (N−1)th bit terminal thereof to receive the sign bit of signal V.

The following Table 1 shows part of the data to be stored in, e.g., ROM 14U. In Table 1, the column represents phase angles θ (degree) and the row represents only three points (0, Amax/2, Amax; Amax is the maximum amplitude) of amplitude data of each phase angle. If the amplitude data of Table 1 is N-bit data (e.g., 4-bit data), counter 17 having more than N+1 bits is used (e.g., 5-bit counter).

TABLE 1

| θ | A = 0 | — | A = Amax/2 | — | A = Amax |
|---|---|---|---|---|---|
| 0 = 0 | 0000 | | 0000 | | 0000 |
| 1 | 0000 | | 0001 | | 0001 |
| 2 | 0000 | | 0001 | | 0010 |
| 3 | 0000 | | 0010 | | 0011 |
| 4 | 0000 | | 0010 | | 0100 |
| 5 | 0000 | | 0010 | | 0101 |
| 6 | 0000 | | 0011 | | 0101 |
| 7 | 0000 | | 0011 | | 0110 |
| 8 | 0000 | | 0011 | | 0111 |
| 9 | 0000 | | 0011 | | 0111 |
| 10 | 0000 | | 0011 | | 0111 |
| 11 | 0000 | | 0011 | | 0111 |
| 12 | 0000 | | 0011 | | 0111 |
| 13 | 0000 | | 0011 | | 0111 |
| 14 | 0000 | | 0011 | | 0110 |
| 15 | 0000 | | 0011 | | 0101 |
| 16 | 0000 | | 0010 | | 0101 |
| 17 | 0000 | | 0010 | | 0100 |
| 18 | 0000 | | 0010 | | 0011 |
| 19 | 0000 | | 0001 | | 0010 |
| 20 | 0000 | | 0001 | | 0001 |
| 21 | 0000 | | 0000 | | 0000 |
| 22 | 0000 | | 1111 | | 1111 |
| 23 | 0000 | | 1111 | | 1110 |
| 24 | 0000 | | 1110 | | 1101 |
| 25 | 0000 | | 1110 | | 1100 |
| 26 | 0000 | | 1110 | | 1011 |
| 27 | 0000 | | 1101 | | 1011 |
| 28 | 0000 | | 1101 | | 1010 |
| 29 | 0000 | | 1101 | | 1001 |
| 30 | 0000 | | 1101 | | 1001 |
| 31 | 0000 | | 1101 | | 1001 |
| 32 | 0000 | | 1101 | | 1001 |
| 33 | 0000 | | 1101 | | 1001 |
| 34 | 0000 | | 1101 | | 1001 |
| 35 | 0000 | | 1101 | | 1010 |
| 36 | 0000 | | 1101 | | 1011 |
| 37 | 0000 | | 1110 | | 1011 |
| 38 | 0000 | | 1110 | | 1100 |
| 39 | 0000 | | 1110 | | 1101 |
| 40 | 0000 | | 1111 | | 1110 |
| 41 | 0000 | | 1111 | | 1111 |

Modulation control circuit 16 is formed of frequency divider 19, modulo 4 (2-bit) counter 20, AND circuits 21 and 22, and NOT circuits 23 and 24. Counter 20 counts clock pulse E15 only when output pulse E19 from frequency divider 19 is logic "1". Frequency divider 19 provides pulse E19 of logic "1" every time counter 20 counts M ($=2^{N-1}-1$) clock pulses E15.

Of count output E20 from counter 20, the upper bit (d) is input to the up/down select terminal of counter 17 and to 3-input AND circuit 21. AND circuit 21 also receives output signal E19 from frequency divider 19 as well as signal E23 obtained by logic-inverting the lower bit (c) of count output E20 from counter 20.

Output E21 (e) from AND circuit 21 is input to the load terminal of up/down counter 17. The lower bit (c) of counter 20 is ANDed with output signal E19 from frequency divider 19 by AND circuit 22. AND output E22 becomes count enable signal E24 via NOT circuit 24, and count enable signal E24 is input to the count enable terminal of counter 17. Counter 17 also receives, as a clock pulse, output E15 from reference frequency generator 15.

The operation of the circuit shown in FIG. 2 will be described with reference to the timing chart of FIG. 3. For the sake of simplicity, assume that reference signal V (E14U) is formed of 4-bit data. In this case, the maximum and minimum values of signal V are 7 and −7, respectively. The true minimum value −8 of the 4-bit data is not used, so that signal V has a waveform symmetrical with respect to 0 when signal V changes to cross a zero point. It is also assumed that counter 17 is a 5-bit type ((4+1)-bit type) counter and frequency dividing ratio M of frequency divider 19 is 7 ($=2^{4-1}-1$) (Generally speaking, when counter 17 is a (N+a)-bit type for N-bit reference signal V, frequency dividing ratio M is $2^{N-a}-1$).

FIG. 3(a) shows the waveform of clock pulse E15 output from generator 15. Frequency divider 19 outputs pulse E19 having a width corresponding to one period of pulse E15, as shown in FIG. 3(b), when it counts 7 clock pulses E15. Modulo 4 counter 20 counts pulse E15 only when output pulse E19 from frequency divider 19 is logic "1", and outputs a count (E20) as shown in FIGS. 3(c) and 3(d). FIGS. 3(c) and 3(d) respectively show the lower and upper bits of count output E20 from 2-bit counter 20.

AND circuit 21 ANDs upper bit output signal E20 (d) from counter 20, NOTed signal E23 of lower bit output signal E20 (c), and output signal E19 (b) from frequency divider 19. Thus, output E21 from AND circuit 21 is a signal (e) corresponding to pulse signal E19 (b), which is obtained only when the count of counter 20 is 2. Signal E21 (e) is input to the load terminal of counter 17.

NOT circuit 24 receives ANDed signal E22 of output signal E19 (b) from frequency divider 19 and lower bit output signal E20 (c) from counter 20. NOT circuit 24 inverts signal E22 to provide inverted signal E24, only when count E20 of counter 20 is 1 or 3 and frequency divider 19 outputs pulse E19 (at time T2, T4 in FIG. 3(f)). Signal E24 is input to the count enable terminal of counter 17.

Up/down designation, preset data loading, and count enable of up/down counter 17 are controlled by signals E20 (d), E21 (e), and E24 (f), and counter 17 operates as a PWM signal generator. Signals E20 (d), E21 (e), and E24 (f) are made by logical synthesis of output E19 from 1/7 frequency divider 19 and count output E20 from modulo 4 counter 20. One period of each of signals E20 (d), E21 (e), and E24 (f) corresponds to 28 ($=7\times4$) clock pulses E15. This period corresponds to one period of PWM modulation frequency. Since the load terminal of counter 17 receives signal E21 (e), the content of reference signal V, supplied to the preset terminal of counter 17, is set in counter 17 at time T1 at which clock pulse E15 rises while signal E21 (e) is logic "1".

The count enable terminal of counter 17 receives signal E24 (f), so that counter 17 does not perform counting at time T2 or T4 at which clock pulse E15 rises while signal E24 is logic "0". Since the up/down select terminal of counter 17 receives signal E20 (d), counter 17 performs down counting from time T2 to T4, and up counting from time T4 to T2 of next cycle.

Assume that reference signal V is decimal 0. Since signal V is 4-bit data, it is binary (0000). Since counter 17 is a 5-bit type and the MSB of its preset input terminal receives a signal (binary 0) being the same as the MSB of reference signal V, binary (00000) is supplied to counter 17 as preset data. The count (00000) is preset in counter 17 at time T1, and counter 17 starts the up counting from this count.

FIG. 3(g) shows step waveform C of count E17U of counter 17. Count E17U is set at decimal 6 by clock pulse E15 just before time T2. Since decimal 6 is binary (00110), a signal of logic "0" is output at the MSB of counter 17. Up/down select signal E20 in FIG. 3(d) becomes logic "0" at time T2. At time T2, since signal E24 of logic "0" is input to the count enable terminal of counter 17, counter 17 temporarily stops its up counting and resumes its down counting at the next clock pulse E15. The count of waveform C of FIG. 3(g) changes from 0 to −1 at time T3. Decimal −1 is binary (11111), and the MSB output of counter 17 changes from logic "0" to "1" at this time T3.

Thereafter, counter 17 continues down counting, and its count becomes −7 by clock pulse E15 just before time T4. Decimal −7 is binary (11001). Counter 17 temporarily stops its counting at time T4 and performs up counting until time T5. Time T5 corresponds to the start time T1 of the next cycle. Thus, at time T5, preset input data (V=E14U) is again preset in counter 17, and the same operation is repeated. When preset reference signal V is not renewed, the count (E17U) of counter 17 returns to 0 precisely at time T5 and coincides with the value of reference signal V.

Reference symbol C of FIG. 3(h) represents the state of the MSB of count E17U of counter 17 from time T1 to T5 (i.e., one period of modulation frequency), where V=0. One period of modulation frequency corresponds to the period of 28 clock pulses E15 and the PWM output signal is logic "0" during 14 clock pulses E15. Therefore, the duty factor in this case is 50% (=14/28).

Reference symbols A to E in FIG. 3(g) indicate counts of counter 17 for various reference signals V (=7, 4, 0, −4, and −7). Reference symbols A to E of FIG. 3(h) indicate PWM output signal waveforms corresponding to counts A to E, respectively, in FIG. 3(g). Each one (E17U) of counts A to E has maximum and minimum values at time T2 and T4, respectively.

Reference symbol A in FIG. 3(g) shows a case when reference signal V is maximum value 7. In this case, the maximum and minimum values of the count (E17U) are 13 and 0, respectively. Since 5-bit is assigned to up/down counter 17, counter 17 does not overflow. Then, no change appears in the MSB of counter 17 even when the count (E17U) reaches at its maximum value 13 which is allowed for V=7. Decimal 7, 13, and 0 are binary (00111), (01101), and (00000), respectively, and the 5th bit (MSB) of these binary values are all "0". The duty factor for the MSB output to be logic "0" is thus 100% (=28/28), as indicated by symbol A in FIG. 3(g).

Reference symbol B in FIG. 3(g) indicates a case when reference signal V is 4. In this case, the maximum and minimum values of the count (E17U) are 10 and −3, respectively. Since decimal 4, 10, and −3 are binary (00100), (01010), and (11101), the MSB changes. In this case, the MSB is logic "0" for the period of 22 clock pulses E15. In other words, the duty factor is about 79% (=22/28).

Reference symbol C in FIG. 3(g) indicates a case when reference signal V is 0. In this case, the duty factor of the MSB of counter 17 is 50%, as described before.

Reference symbol D in FIG. 3(g) indicates a case when reference signal V is −4. In this case, the maximum and minimum values of the count (E17U) are 2 and −11, respectively. Decimal −4, 2, and −11 are binary (11100), (00010), and (10101). Thus, the MSB changes, and the MSB is logic "0" for the period of 6 clock pulses E15. The duty factor for the MSB to be logic "0" is about 21% (=6/28).

Reference symbol E in FIG. 3(g) indicates a case when reference signal V is −7. In this case, the maximum and minimum values of the count (E17U) are −1 and −14, respectively. Decimal −7, −1, and −14 are binary (11001), (11111), and (10010). The duty factor for the MSB to be logic "0" is 0% (=0/28). In this case, overflow does not occur when down counting is performed from a negative value. This is because 5-bit up/down counter 17, which has a number of bits larger than 4 bits of preset data (V), is used.

Figure 4:
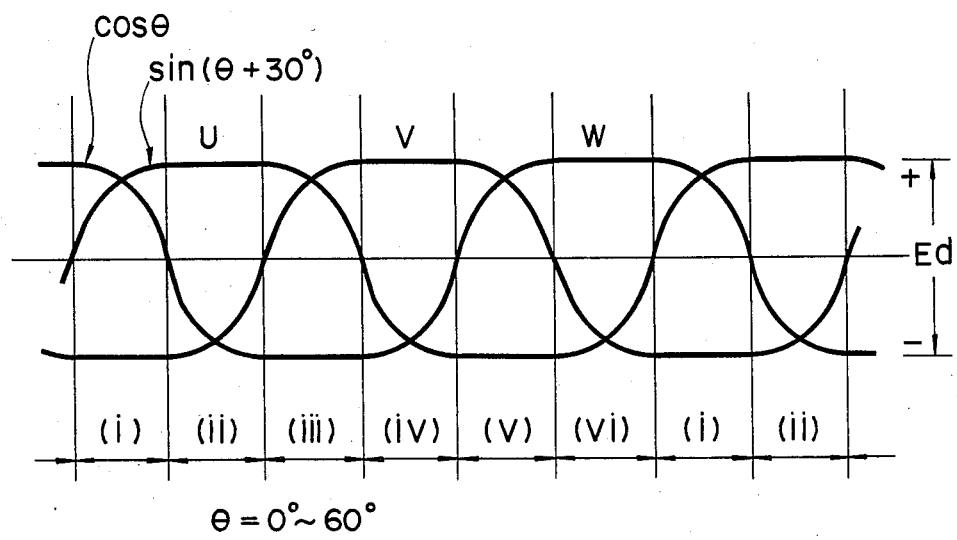
FIG. 4 shows examples of output voltage waveforms of the respective phases (U, V, W) of the three-phase V/F controller shown in FIG. 1.
Figure 5:
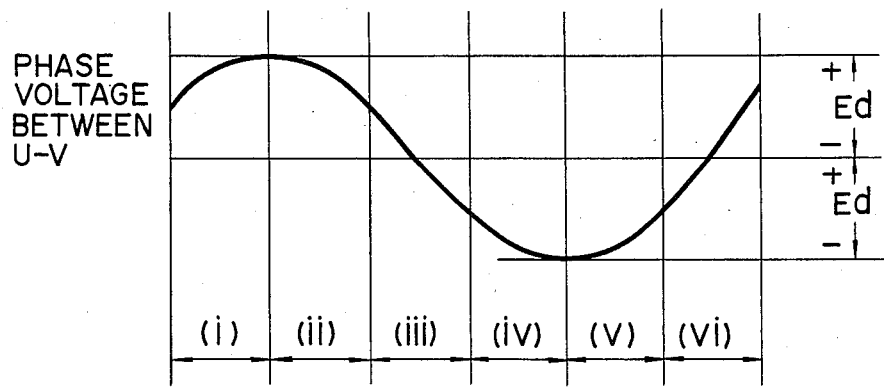
FIG. 5 shows a U-V phase voltage of a sine waveform obtained from the voltage waveform of FIG. 4.

FIG. 4 shows waveforms (quasi-sine waves each having an amplitude of Ed) of respective phase output voltages of the three-phase V/F controller shown in FIG. 1. FIG. 5 shows a waveform (a sine wave having an amplitude of ±Ed) of the phase voltage between U and V phases among the voltage waveforms shown in FIG. 4. FIG. 4 exemplifies waveforms of non-sine waves obtained by the data stored in ROMs 14U to 14W of FIG. 1. These data are set such that U−V, V−W, and V−U voltages are sine waves (see FIG. 5). (Of course, when the data stored in ROMs 14U to 14W are sine data, the resultant phase voltages become substantially sine waves.) In short, as far as the phase voltage can be made a sine waveform having a small lower-order harmonic distortion, the data stored in ROMs 14U to 14W can be optional.

Assume that the inverter output must be as high as possible. To be concrete, it is assumed that an induction motor is to be operated at its rated frequency or at a frequency higher than the rated frequency. In this case, a higher operation efficiency can be obtained if PWM is not performed at all but a rectangular wave, whose voltage potential alternatively changes between positive and negative for 180 degrees, is output to each of U, V, and W phases, although such a rectangular wave involves large lower-order harmonic distortion components.

When the data in ROMs 14U to 14w are triangular waves, the respective phase output voltages from the inverter have waveforms similar to triangular waves. In this case, more lower-order harmonic distortion components are involved than in a case of sine waves, and the motor operation efficiency is degraded. Therefore, data in the ROM is preferably sine wave data or quasi-sine wave data exemplified by the illustration of FIG. 4.

Figure 6:
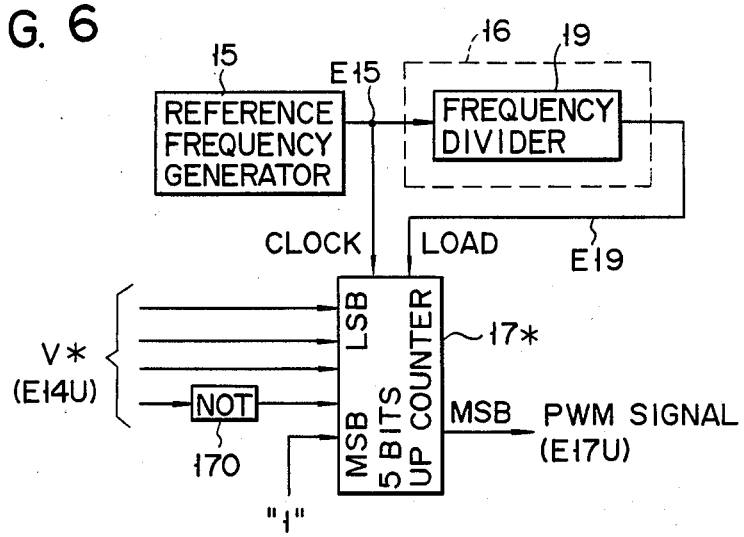
FIG. 6 is a block diagram of another embodiment of the circuit shown in FIG. 1, in which a PWM control circuit for one phase among the three phases is shown.

FIG. 6 shows another embodiment of this invention, in which up/down counter 17 of FIG. 2 is replaced with 5-bit up counter 17*. In the embodiment of FIG. 6, preset data V* as shown in Table 2 is used for the preset input of counter 17*.

TABLE 2

| preset data V* | | preset input | |
| --- | --- | --- | --- |
| decimal | binary | add bit | binary |
| 7 | 0111 | 1 | 1111 |
| 6 | 0110 | 1 | 1110 |
| 5 | 0101 | 1 | 1101 |
| 4 | 0100 | 1 | 1100 |

TABLE 2-continued

| preset data V* | | preset input | |
|---|---|---|---|
| decimal | binary | add bit | binary |
| 3 | 0011 | 1 | 1011 |
| 2 | 0010 | 1 | 1010 |
| 1 | 0001 | 1 | 1001 |
| 0 | 0000 | 1 | 1000 |
| −1 | 1111 | 1 | 0111 |
| −2 | 1110 | 1 | 0110 |
| −3 | 1101 | 1 | 0101 |
| −4 | 1100 | 1 | 0100 |
| −5 | 1011 | 1 | 0011 |
| −6 | 1010 | 1 | 0010 |
| −7 | 1001 | 1 | 0001 |
| −8 | 1000 | 1 | 0000 |

According to the embodiment of FIG. 6, the MSB of 4-bit preset data V* is level-inverted by NOT circuit 170, and the MSB of the preset input of counter 17* is fixed at logic "1".

When data V* of Table 2 is applied to 5-bit counter 17*, a 4-bit binary counter is used for 1/16 frequency divider 19. In this case, the duty factor of the PWM signal (E17U) changes between 15/16 and 0/16 in units of 1/16, in response to the change of data V* between decimal +7 and −8 (or between binary 0111 and 1000).

FIGS. 7(a) to 7(f) show signal waveforms obtained in the circuit of FIG. 6. Between time t10 to t30 of FIG. 7(c), the count contents of counter 17*, obtained for V*=0, are illustrated. At time t10, binary preset input data (11000) corresponding to V*=0 (see Table 2) is preset at 5-bit counter 17* in response to load signal E19 (FIG. 7(b)). After completing this data preset, the content of counter 17* increases by the count of clock signal E15 (FIG. 7(a)). When the count content of counter 17* reaches binary (00000) at time t20 in FIG. 7(c), the MSB of the count output of counter 17* changes from logic "1" to logic "0" as shown at time t20 in FIG. 7(d). The state of MSB="0" continues until the data preset for counter 17* is again performed at time t30. From time t10 to t30, counter 17* counts 16 clocks of E15 and, from time t20 to t30, it counts 8 clocks of E15. Thus, a PWM signal of duty factor 50% (=8/16) is delivered from the MSB of the count output of counter 17*.

Figure 7:
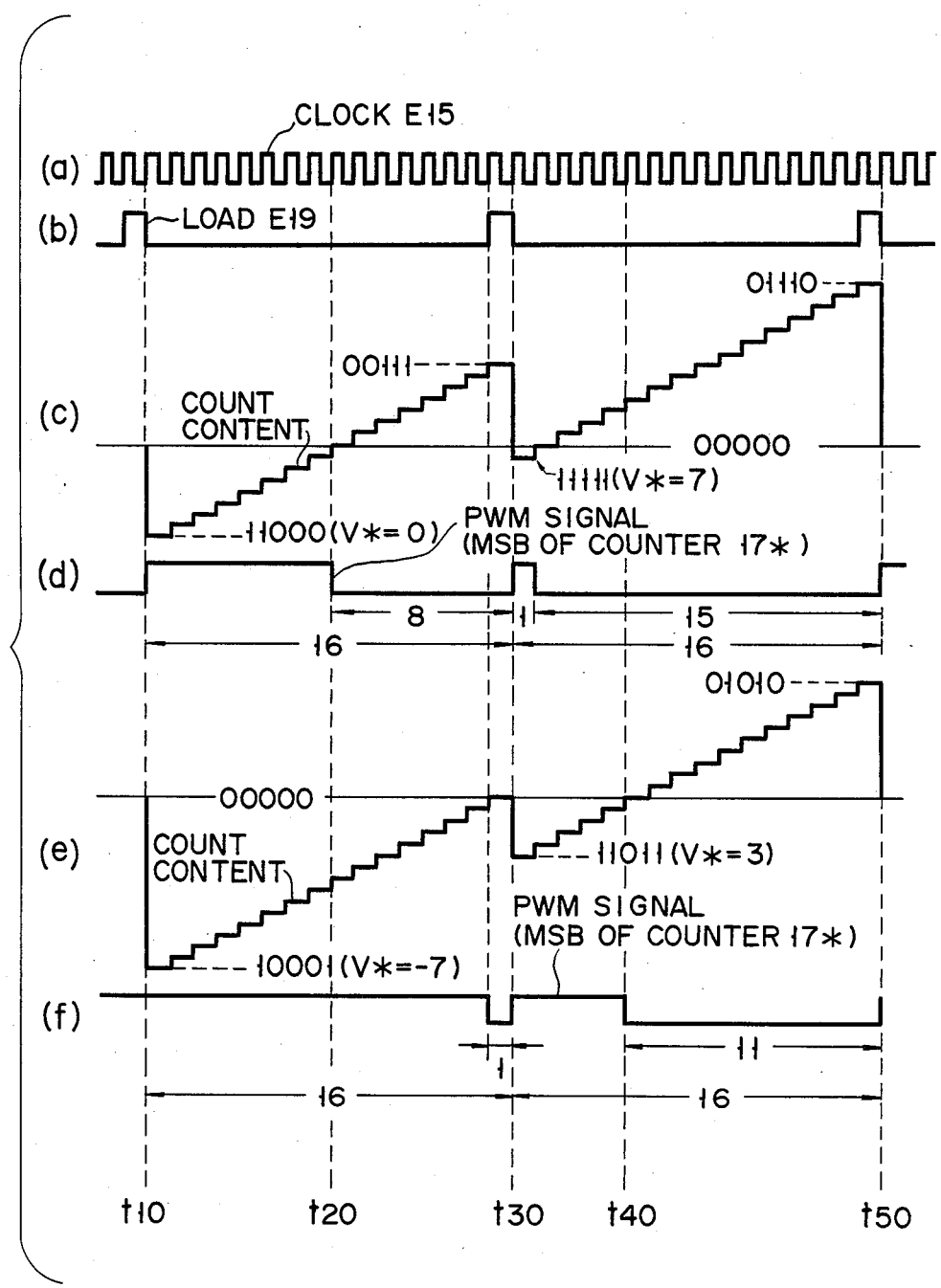
FIGS. 7(a) to 7(f) are timing charts explaining the operation of the circuit shown in FIG. 6.

Between time t30 to t50 of FIG. 7(c), the count contents of counter 17*, obtained for V*=7 (or V*=binary 11111), are illustrated. FIG. 7(d) indicates that a PWM signal of duty factor 6.3% (=1/16) is obtained from the MSB of the count output of counter 17*, when V*=7.

Between time t10 to t30 of FIG. 7(e), the count contents of counter 17*, obtained for V*=−7 (or V*=binary 10001), are illustrated. FIG. 7(f) indicates that a PWM signal of duty factor 93.8% (=15/16) is obtained from the MSB of the count output of counter 17*, when V*=−7.

Between time t30 to t50 of FIG. 7(e), the count contents of counter 17*, obtained for V*=3 (or V*=binary 11011), are illustrated. FIG. 7(f) indicates that a PWM signal of duty factor 31.3% (=5/16) is obtained from the MSB of the count output of counter 17*, when V*=3.

Figure 8:
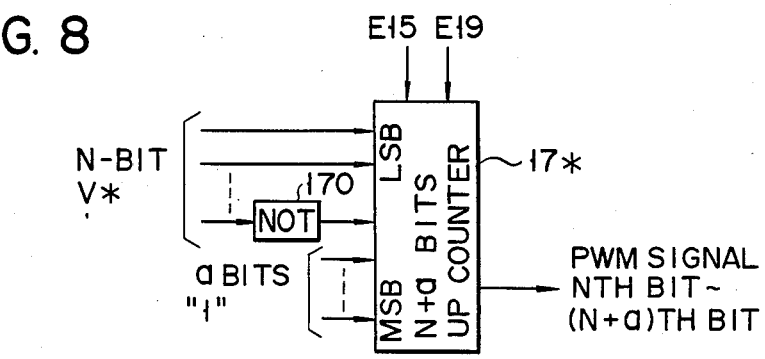
FIG. 8 shows a partial modification of the circuit in FIG. 6, in which (N+a)-bit presettable up counter is adapted for N-bit preset data V*.

FIG. 8 shows a partial modification of the circuit in FIG. 6. In modification of FIG. 8, (N+a)-bit presettable up counter 17* is adapted for N-bit preset data V* (a≧1). Any one bit data of Nth to (N+a)th bit of the count output from counter 17* provides a PWM control signal (E17).

Incidentally, the up counter of FIG. 6 or 8 can be replaced with a down counter.

Figure 9:
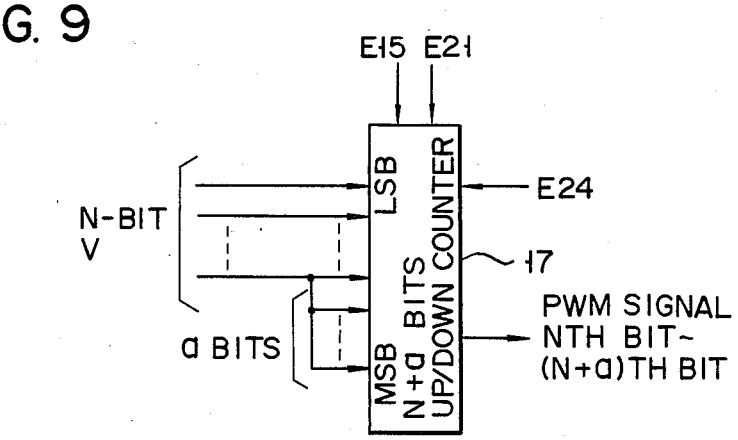
FIG. 9 shows a partial modification of the circuit in FIG. 2, in which (N+a)-bit presettable up/down counter is adapted for N-bit preset data V.

FIG. 9 shows a partial modification of the circuit in FIG. 2. In modification of FIG. 9, (N+a)-bit presettable up/down counter 17 is adapted for N-bit preset data V (a≧1). Any one bit data of Nth to (N+a)th bit of the count output from counter 17 provides a PWM control signal (E17).

According to an embodiment of the present invention, when reference signal V is changed from 7 to −7, the duty factor of the PWM output signal changes from 1 to 0 in units of 1/14, and a PWM signal (E17U to E17W) having a width proportional to reference signal V can be obtained in the entire range from its maximum to minimum values.

Figure 3:
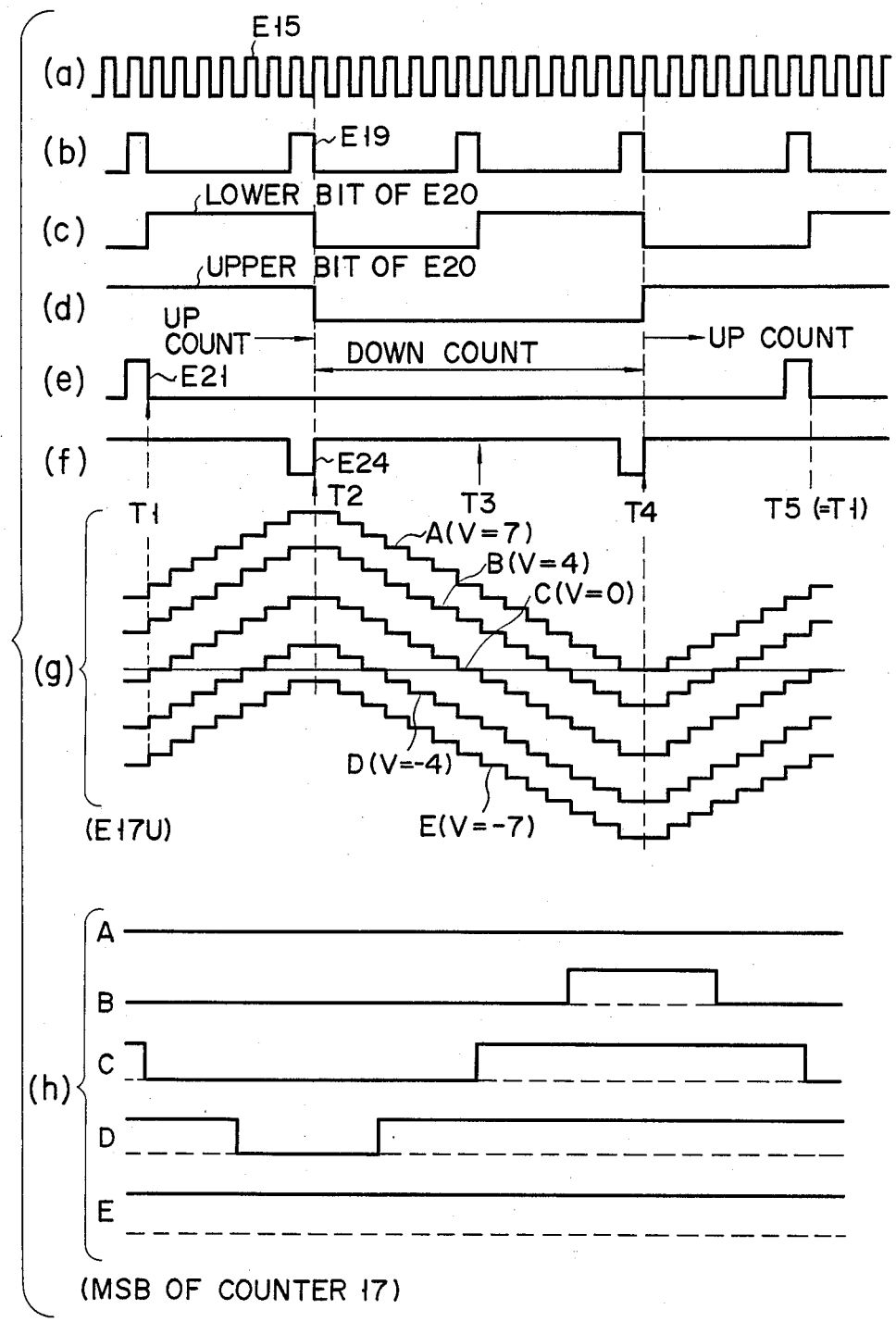
FIGS. 3(a) to 3(h) are timing charts explaining the operation of the circuit shown in FIG. 2.

In the embodiment of FIGS. 2 and 3, 4-bit data is used for the reference signal for the sake of simplicity. When an 8-bit up/down counter is used in the circuit of FIG. 1 in order to enhance the resolution, PWM with a 7-bit resolution can be performed. In this case, the frequency dividing ratio of frequency divider 19 may be set at 63.

Since the PWM control circuit is a digital circuit, a high-speed PWM can be performed without drift of its operation point. Therefore, the V/F controller shown in FIG. 1, that uses the PWM control circuit of this invention, can perform an accurate PWM correctly following sine wave reference signal V supplied from ROMS 14U to 14W, to thereby efficiently operate an induction motor at various speeds. Even when three-phase PWM is to be performed, as shown in FIG. 1, up/down counters 17 are simply required in units of phases, and only one reference frequency generator 15 and one modulation control circuit 16 are required for the entire control. Therefore, a multi-phase PWM signal can be obtained by a very simple circuit configuration.

What is claimed is:

1. A digital PWM control circuit comprising:
reference signal generating means for generating a binary reference signal having N bits and including a sign bit, said N being an integer not less than 1;
control signal generating means for generating a load signal at every predetermined period and an enable signal at a predetermined timing; and
N+a bit counter means, coupled to said reference signal generating means and said control signal generating means, for receiving N+a bit preset data to be preset therein upon generation of the load signal, the N+a bit preset data being obtained by combining the N bit binary reference signal and a-bit data having the same content as the sign bit of the binary reference signal, said a being an integer not less than 1, and said N+a bit counter means counting a predetermined clock signal under generation of the enable signal, wherein any bit data of Nth to (N+a)th bit of said counter means is provided as a PWM control signal.

2. A circuit according to claim 1, wherein said control signal generating means includes:
means for generating a count mode select signal that changes in level at a generation timing of the enable signal within one period of the load signal, and
said counter means includes:
an up/down counter in which the N+a bit preset data is preset by the generation of the load signal and which does not count the clock signal when the enable signal is not generated, said up/down counter being set in one of up and down counting modes in accordance with a signal level of the count mode select signal.

3. A circuit according to claim 2, wherein said control signal generating means includes:
   clock signal generating means for generating the clock signal;
   first frequency dividing means, coupled to said clock signal generating means, for frequency-dividing the clock signal at a predetermined frequency dividing ratio M and thus generating a frequency division signal, said M being an integer; and
   second frequency dividing means, coupled to said first frequency dividing means, for counting the clock signal while the frequency division signal is generated, and generating the count mode select signal.

4. A circuit according to claim 3, wherein the frequency dividing ratio M is given by $2^{N-a}-1$.

5. A circuit according to claim 3, wherein said second frequency dividing means generates a timing signal having a period shorter than that of the count mode select signal and phase-locked with the frequency division signal, and said control signal generating means further includes:
   first gate means, coupled to said first and second frequency dividing means, for generating the enable signal in response to a logical AND of the frequency division signal and the timing signal.

6. A circuit according to claim 5, wherein said control signal generating means further includes:
   second gate means, coupled to said first and second frequency dividing means, for generating the load signal in response to a logical AND of the frequency division signal, the timing signal, and the count mode select signal.

7. A circuit according to claim 5, wherein said second frequency dividing means includes a binary counter, the count mode select signal is delivered from the least significant bit of said binary counter, and the timing signal is delivered from a bit higher than the least significant bit of said binary counter.

8. A circuit according to claim 6, wherein said second frequency dividing means includes a binary counter, the count mode select signal is delivered from the least significant bit of said binary counter, and the timing signal is delivered from a bit higher than the least significant bit of said binary counter.

9. A digital PWM control circuit comprising:
   reference signal generating means for generating a binary reference signal having N bits and including a sign bit, said N being an integer not less than 1;
   control signal generating means for generating a load signal at every predetermined period and a clock signal; and
   N+a bit counter means, coupled to said reference signal generating means and said control signal generating means, for receiving N+a bit preset data to be preset therein upon generation of the load signal, the N+a bit preset data being obtained by combining the N bit binary reference signal whose most significant bit is level-inverted and a-bit data having a given content, said a being an integer not less than 1, and said N+a bit counter means counting the clock signal, wherein any bit data of Nth to (N+a)th bit of said counter means is provided as a PWM control signal.

10. A circuit according to claim 9, wherein said control signal generating means includes:
    clock signal generating means for generating the clock signal; and
    frequency dividing means, coupled to said clock signal generating means, for frequency-dividing the clock signal, at a predetermined frequency dividing ratio, to provide the load signal.

* * * * *